United States Patent [19]

Wengrovius et al.

[11] Patent Number: 5,817,729
[45] Date of Patent: Oct. 6, 1998

[54] VAPOR PRECIPITATION OF POLYMERS FROM SOLVENT POLYMER BLENDS BY AZEOTROPIC SPRAY DRYING

[75] Inventors: Jeffrey H. Wengrovius, Scotia; Richard W. Green, Ballston Spa; Clayton B. Quinn, Burnt Hills, all of N.Y.

[73] Assignee: General Electric Company, Waterford, N.Y.

[21] Appl. No.: 783,396

[22] Filed: Jan. 13, 1997

Related U.S. Application Data

[62] Division of Ser. No. 552,685, Nov. 3, 1995, Pat. No. 5,618,902.

[51] Int. Cl.⁶ .................................................. C08G 77/00
[52] U.S. Cl. ........................... 528/10; 528/196; 528/272; 528/501; 203/51; 203/90
[58] Field of Search ............................... 528/501, 10, 196, 528/272; 203/51, 90

[56] References Cited

U.S. PATENT DOCUMENTS

| | | |
|---|---|---|
| 2,676,182 | 4/1954 | Daudt et al. . |
| 5,248,087 | 9/1993 | Dressler . |
| 5,319,040 | 6/1994 | Wengrovius et al. . |
| 5,324,806 | 6/1994 | Wengrovius et al. . |
| 5,357,007 | 10/1994 | Wengrovius et al. . |

FOREIGN PATENT DOCUMENTS

| | | |
|---|---|---|
| 2 209 818 A | 12/1972 | France . |
| 2 505 202 A | 4/1982 | France . |
| 11 38 945 A | 3/1960 | Germany . |
| 26 26 124 A | 11/1976 | Germany . |
| 907 066 | 3/1961 | United Kingdom . |
| 1 174 945 | 1/1967 | United Kingdom . |

*Primary Examiner*—Melvin I. Marquis
*Attorney, Agent, or Firm*—Kenneth S. Wheelock

[57] ABSTRACT

A process for removing contaminating solvents from solutions containing solid solutes comprising contacting a co-solvent that forms an azeotrope with the contaminating solvent forming a mixture thereby and spray drying the contaminating solvent co-solvent mixture in the presence of the co-solvent at a temperature equal to or above the temperature where the azeotrope distills whereby the contaminating solvent has been azeotropically distilled away from the solute. The process is particularly useful for polymeric solutes, especially silicones.

10 Claims, No Drawings

VAPOR PRECIPITATION OF POLYMERS FROM SOLVENT POLYMER BLENDS BY AZEOTROPIC SPRAY DRYING

This is a divisional of application Ser. No. 08/552,685 filed on Nov. 03, 1995, now U.S. Pat. No. 5,618,902.

FIELD OF THE INVENTION

The present invention relates to a process for removing undesired, i.e. contaminating, solvents from solvent solute compositions by means of a high temperature vapor wherein the vapor forms an azeotrope with the contaminating solvent (s) present in the solution wherein when the solution is so processed the azeotrope is distilled and the solute is purified of the contaminating solvent.

More particularly the present invention relates to the spray drying in the presence of a solvent vapor or azeotropic mixture of solvent vapors of an organic solvent dispersion of a polymeric solute to form a free-flowing powder free of contaminating solvent. A preferred polymer is a silicone polymer.

BACKGROUND OF THE INVENTION

A method for making silicone powders is shown in U.S. Pat. No. 4,935,484 ('484). Aqueous colloidal suspensions of silicone polymer, copolymer are spray dried to produce silicone powders having an average particle diameter of 10 to 150 nm. Although the powders so-produced may be utilized in a variety of applications, the powder still contains the emulsifying agent used in its preparation as an impurity.

As taught in the '484 patent, the silicone powder made by the process of spray drying an aqueous silicone polymer, copolymer can be used in plastics as a substitute for finely divided silica that has been rendered hydrophobic. However, the aqueous spray dried powder produced by the process of the '484 patent is incompatible with other silicone fluids when the polymer, copolymer so spray dried is a polymer, copolymer of triorganosiloxy units combined with tetrasiloxy units.

Because of the deficiencies of the '484 patent, it is therefore desirable to be able to produce free-flowing organosilicon powders having a particle size in the range of about 0.10 to about 200 microns and an aggregate size in the range of 10 microns to about 200 microns where such a powder would be compatible with other silicone polymers and therefore combinable. Such materials where this would present a useful feature are in combinations with alkenyl substituted organopolysiloxanes and hydride silicone fluids.

SUMMARY OF THE INVENTION

Broadly conceived the present invention utilizes the formation of azeotropes in conjunction with the process of spray drying to remove unwanted solvents from solutions and thereby purify the solution of the unwanted solvent or remove the solvent entirely to produce a solid that is substantially free of the unwanted solvent.

Thus there is broadly provided a process for removing a contaminating solvent from a solution containing one or more solutes comprising:

(a) contacting said solution with a co-solvent having a boiling temperature wherein said co-solvent is immiscible with said solute and wherein said co-solvent boils at a temperature different from the boiling temperature of said contaminating solvent and wherein said co-solvent forms an azeotrope with said contaminating solvent; and (b) spray drying said solution contaminated with said solvent in the presence of said co-solvent wherein said solvent and said co-solvent distill azeotropically, whereby said contaminating solvent is removed from said solute.

As particularly embodied, the process of the present invention may be applied to solutions containing polymers, more particularly to polymers of silicones, and most particularly to silicone polymers having the formula:

where the subscripts j and k are zero and the subscripts i and p are non-zero and positive. When the process of the present invention is applied to the preferred silicone polymer, a finely divided powdered silicone polymer results that is substantially free of the contaminating solvent (or contaminating solvent mixture).

DETAILED DESCRIPTION OF THE INVENTION

Polymers resulting from the solution synthesis or solution mediated synthesis or similar processes can frequently be an intractable solid if the organic solvent is removed. When removal of the solvent after the polymer or copolymer is synthesized would produce an intractable solid, the solvent generally is not removed and the product is used as a dispersion or solution in the solvent of its manufacture. This has necessitated the development of high solids content synthetic approaches or novel methods of removing the contaminating solvent.

Polymers, or for the purposes of the process of the instant invention oligomeric materials synthesized in an organic solvent or prepared by a solvent assisted or mediated process, are thermoplastic polymers including but not limited to polyethers, polysulfides, polyimides, polyamides, polyetherimides, polyetheramides, polysulfones, polyurethanes, polyesters, polycarbonates, silicones, alloys of any of the foregoing and mixtures thereof. The process of the present invention is particularly well-suited for polyesters, polycarbonates, silicones and the like. In the case of silicones there is a wide variety of compositions that constitute the silicone polymers that may be dried by the process of the present invention:

MDM,
TD,
MT,
MDT,
MDTQ,
MQ,
MDQ,
MTQ and the like. These formulas are individual selections from a general formula for silicones comprising:

where the subscripts i, j, k, and p may independently be zero or a positive number subject to the proviso that when p is non-zero one of i, j, and k must also be non-zero. For purposes of clarity, M is a mono-functional group having a generic formula $R_3SiO_{1/2}$, D is a difunctional group having a generic formula $R_2SiO_{2/2}$, T is a trifunctional group having a generic formula $RSiO_{3/2}$, and Q is a quadrifunctional group having the formula $SiO_{4/2}$. In these examples, the substituent R groups may be any of a very large variety of organic radicals, which of course may be independently selected. In the case of the M groups all three R groups may be different, two may be alike, or all three may be identical. Similarly for the D groups, the R groups may be identical or different. In building up silicone polymers, copolymers may be created where two or more different M, D, or T groups are utilized in the synthesis. Thus the above list may be permuted indefinitely. Usually these monovalent R substituent groups are selected from hydrogen, one to forty carbon alkyl groups, two to forty carbon alkenyl groups, six to forty carbon aryl groups, and seven to forty carbon alkylaryl (or alkaryl) groups. Further these substituent R groups, when they are not hydrogen, may be partially halogenated with fluorine, chlorine, bromine, and iodine or substituted with oxygen or sulfur derivatives such as hydroxyl or mercapto groups, esters, thioesters, ethers, thioethers and the like, or any combination of these.

Some of the solvents used for these polymerization and oligomerization processes are benzene, toluene, xylene, mixed aromatic solvents, paraffinic hydrocarbons, mixtures of 5 to 20 carbon atom paraffinic solvents, and one to ten carbon atom alcohols. Recently this problem has been overcome by removing the solvent through spray drying as taught in U.S. Pat. Nos. 5,319,040; 5,324,806; and 5,357,007. This produces a finely divided polymer powder that is not intractable, that is easy to handle and that disperses well in other silicones. The technique is generalizable to other solvent contaminated polymer compositions. For example, polyesters, polycarbonates and the like which are synthesized via a solvent mediated polymerization reaction can form intractable solid masses above certain threshold molecular weights if the solvent is removed. Thus these recently developed techniques of spray drying may provide a convenient means of producing higher molecular weight polymers and conveniently removing most of the solvent from the product producing a finely divided easily handled powder.

While the techniques disclosed in the '040, '806, and '007 patents remove a significant fraction of the solvent by the simple expedient of spray drying, not all of the solvent is removed. This is either a benefit or a detriment depending on whether the presence of trace amounts of solvent assist converting the product to useful forms or whether the solvent represents a contaminant that must be removed. In the case of trace aromatic solvents such as benzene or toluene, if the product will be used in applications which do not involve the human body, the solvent contamination by aromatic solvents may be of no particular concern. In contrast, for cosmetic and personal care formulations or where the resin or thermoplastic will be a component of a medical device such solvent contamination assumes more serious proportions.

The present invention provides a significant departure from these prior teachings in that the spray drying of the solvent polymer mixture is conducted in the presence of an additional solvent or solvent mixture, hereinafter referred to as a co-solvent By choosing the co-solvent, so that the co-solvent forms an azeotrope with the solvent or solvent mixture carrying the polymer, copolymer, resin or thermoplastic, the process of spray drying also simultaneously acts as an azeotropic distillation and the polymer, copolymer resin or thermoplastic precipitates as a finely divided powder in the spray drying apparatus. This new process makes it possible to reduce solvent contamination of the polymer, copolymer, resin or thermoplastic to significantly lower levels than can be achieved by the process of spray drying unassisted by a co-solvent.

The organic solvents which mediate the synthesis or which are used as solvents for the synthesis of polymers, copolymers, resins, or thermoplastics are typically solvents that have a boiling point below 250° C. Thus for example if a polymeric material is prepared by a solvent mediated polymerization where the solvent is benzene, the spray drying of the resulting benzene (solvent) contaminated polymer is accomplished using water as a co-solvent forming the classic benzene-water azeotrope. Performing the azeotropic spray drying at temperatures equal to or above where the benzene water azeotrope distills results in the azeotropic distillation of the azeotrope away from the polymer resulting in the precipitation of the polymer. Suitable co-solvents are water, ethylene glycol, propylene glycol, butyl alcohol, isobutyl alcohol, allyl alcohol, acetic acid, 2-chloro-ethanol, ethylene diamine, nitroethane, pyruvic acid, 1-chloro-2-propanone, epichlorohydrin, propionic acid, and 1,2-propanone diol.

In order to remove the contaminating solvent, the choice of co-solvent should be one that is not miscible or soluble with the solute or polymer. The use of an immiscible or insoluble co-solvent during azeotropic spray drying results in a polymer (or solute) having a low concentration of the contaminating solvent without introducing a secondary contamination by the co-solvent A further consideration, is that the co-solvent selected for azeotropic spray drying must form a lower boiling point azeotrope with the contaminating solvent relative to the boiling point of the co-solvent itself. This requirement leads to a multi-phase system where there is at least one vapor phase and two required liquid phases. The process of the present invention requires that the co-solvent component of the azeotropic mixtures be selected so that the contaminating solvent distills from the lower boiling liquid phase present during spray drying. The existence of these phases, partitions the contaminating solvent into a lower boiling liquid phase which is rejected during the spray drying process by azeotropic distillation thereby purifying the solute or polymer.

Spray drying of the solvent contaminated polymer in the presence of a co-solvent may be accomplished by techniques known in the art or with a spray dryer having at least one vortex atomizer nozzle, a spray dryer having a two fluid nozzle, or as disclosed in U.S. Pat. No. 5,248,087 a spray dryer having a droplet generator.

The temperatures of the spray drying process can vary from as low as 50° to as high as 300° C., depending on the solvent of preparation and the choice of co-solvent. Preferably these ranges are 90° to 300° C., a range of 100° to 250° C. is more preferable, and a range of 150° to 200° C. is most preferred. In the event that it is desired to lower the heat duty on the spray dryer these preferred ranges change to 60° to 250° C. preferred, 65° to 200° C. more preferred, and 70° to 190° C. most preferred. Further when high boiling solvents and co-solvents are used these preferred ranges again change to 100° to 300° C., 150° to 300° C. more preferred, and 200° to 300° C. most preferred.

There is provided by the present invention, a method for making a free-flowing silicone powder. Such free-flowing powder may be more easily blended with other silicone materials resulting in more stable formulations. One specific embodiment of the method of the present invention comprises:

(1) forming an organosiloxane hydrolyzate, considered a polymer for purposes of the process of the present invention, comprising triorganosiloxy units and tetrasiloxy units having an triorganosiloxy to tetrasiloxy ratio of about 0.65:1 to about 3:1, (2) separating the organosiloxy hydrolyzate from the mixture of step (1) in the form of an organic solvent dispersion or solution, and (3) spray drying the organic solvent dispersion or solution resulting from step (2) in the presence of steam, or an azeotropic mixture of steam and the solvent or solvent mixture used in step (2).

The triorganosiloxy groups, M, have the formula:

$$M = R_3SiO_{1/2},$$

where the R groups, which may be independently selected, are hydrogen and one to forty carbon atom monovalent hydrocarbon radicals. R is preferably selected from the group consisting of hydrogen, one to six carbon atom alkyl groups, six to twenty carbon atom aryl groups, and seven to twenty carbon atom alkylaryl groups, R is more preferably a methyl group. Since R is defined in terms of a carbon framework only, there may be other substituents functionalizing the R substituents. Thus R includes halogenated methyl groups such as trifluoromethyl, trichloromethyl, halogenated higher alkyls such as trifluoropropyl, halogenated aryls such as chlorophenyl, oxygenated aryls such as phenolic substituents and the like. Additonal triorganosiloxy units, M' and M", may comprise part of the mixture being hydrolyzed. Such triorganosiloxy groups have the following formulas:

$$M' = R_2R^1SiO_{1/2} \text{(alternatively } R_2R^1Si\text{), and}$$

$$M'' = R_2HSiO_{1/2} \text{(alternatively } R_2HSi\text{)}$$

where R is as previously defined and $R^1$ is a two to forty carbon atom alkenyl group. The triorganosiloxy units may additionally comprise D units of the formula:

$$R^2RSiO_{2/2} \text{(alternatively } R^2RSiO\text{) and}$$

T units of the formula $$RSiO_{3/2} \text{(alternatively } RSiO_3\text{)}$$

where R is as previously defined and $R^2$ is selected from the group consisting of R, $R^1$ and H. The quantities of D and T units that may be present independently range up to about 25 mole percent The tetrasiloxy units have the formula:

$$SiO_{4/2}$$

The organic hydrolyzate included within the description of the process of the present invention may be dispersible or soluble in aromatic solvents such as benzene, toluene, xylenes, xylol and the like.

The organosiloxane hydrolyzate may contain from about 0.02 to about 5 weight percent and preferably from about 0.1 to about 3 weight percent and most preferably from about 0.5 to about 2.5 weight percent hydroxy radicals based on the total weight of organosiloxane.

A method for producing the triorganosiloxane hydrolyzate is disclosed in U.S. Pat. No. 2,676,182 ('182). In the '182 patent a silica hydrosol is reacted under acidic conditions with a source of triorganosiloxy units such as hexamethyldisiloxane or a hydrolyzable triorganosilane such as a trimethylchlorosilane followed by recovering a silicone polymer or copolymer that is dispersible in an organic solvent such as benzene.

A specific embodiment of the instant invention applicable primarily to silicones having the general structural formula of MQ, MM$^{vi}$Q, MD$^{vi}$Q, MM$^H$Q, MD$^H$Q, MDTQ TD and permutations thereof comprises:

(1) Preheating an organic solution of the silicone to a temperature ranging between 50° and 300° C.

(2) Pressurizing the solution and passing the solution through a two phase spray nozzle wherein the solution contacts the vapor of a co-solvent in which the silicone is sparingly soluble and which forms an azeotrope with the organic solvent. Further, the organic solvent should be present in a molar quantity that is greater than that of the co-solvent or co-solvent mixture for purposes of forming an azeotrope that will function in the process of the present invention. The effect of these conditions is to precipitate particles of silicone from the solvent at the same time that the solvent is stripped from the silicone by the action of the co-solvent in forming an azeotrope. Any remaining liquid, accompanying the silicone particles will usually be the co-solvent The ability of these solvent systems to remove virtually all of the solvent while leaving the solids wetted with co-solvent adds energy efficiency. The solids wetted with co-solvent can then be dried in an indirect contact heat exchanger that allows for heat transfer without increasing the mass of the process stream. An indirect heat exchanger is more energy efficient by comparison to providing all of the heat input for the process from a heated co-solvent.

Particles sizes produced by the process of the instant invention range from about 0.40 to about 1,000 microns, preferably 10 to 200 microns, and most preferably 20 to 100 microns.

(3) Heating the vapor/liquid/solids stream to vaporize the remaining co-solvent liquid and superheat the vapor.

(4) Separating the solids from the superheated vapor via a cyclone separator, fritted metal filters, woven or spun bag filters, or cartridge filters. Cyclone separators may be preferred because of their ability to be designed to capture fine particulate matter more efficiently.

(5) Collection of the recovered solids in a containment vessel supplied with a vapor purge, preferably air or nitrogen. The vapor purge displaces entrained co-solvent vapor from the free void volume of the solids, reducing thereby the final solvent content of the solids.

(6) Condensing the vapor stream with a direct contact or indirect contact heat exchanger. When, as preferred the solvent and co-solvent are immiscible, a direct contact condenser followed by a phase separator provides a particularly efficient means of recycling solvents.

(7) Providing a low pressure outlet for non-condensable gases so that the system runs at less than atmospheric pressure, between 2 and 760 mm Hg, preferably between 25 and 700 mm Hg, more preferably between 50 and 300 mm Hg, and most preferably between 100 and 250 mm Hg. By using a reduced pressure the partial pressures of all the components are reduced. This is particularly important in reducing the amount of entrained co-solvent in the free void volume of the precipitated solids. One particularly useful arrangement for moderately low pressure applications is the use of a liquid jet eductor that provides the direct contact condenser and as a consequence the energy necessary to produce or maintain a low pressure upstream of the eductor. The eductor discharge can then be decanted when immiscible solvent and co-solvent is used, a portion cooled below 27° C., followed by recycle to the eductor as the motive fluid.

Any silicone having a melting point greater than 25° C., preferably greater than 35° C., more preferably greater than 43° C., and most preferably greater than 50° C. and soluble in an organic solvent may be stripped of solvent by the process of the instant invention subject to the limitation that there exists a co-solvent with which the silicone is immiscible and with which the solvent and co-solvent form two liquid phases that will form a low boiling, solvent rich azeotrope.

While a specific embodiment of this solvent removal process involves spray drying to form a free-flowing solid, the process of the present invention might also be employed to dry materials that are normally hard to purify viscous liquids. If this process embodiment is employed, a liquid would collect in the bottom of the spray drier rather than a solid free-flowing powder. The choice of co-solvent in the case of a liquid drying process would then be governed by the additional consideration of immiscibility with the liquid phase being dried as well as well as forming an azeotrope.

The process of the present invention is not limited to solutions of polymers but rather may be extended to include the removal of unwanted solvent from solutions containing desirable products or solutes by adding thereto a co-solvent or a mixture of co-solvents that forms an azeotrope with the unwanted or contaminating solvent and spray drying the solution comprising solute, contaminating solvent and co-solvent thereby removing the contaminating solvent.

A particularly important beneficial aspect of the present invention is that it may be utilized to purify silicone polymers of objectionable (and therefore contaminating) aromatic solvents. This is important because the most convenient synthetic methods used to produce silicone polymers frequently utilize aromatic solvents. One notable example is in the production of silicones possessing long chain hydrocarbyl substituents either as on chain or endstopped substituents. This is a problem because a significant application of various silicones is in personal care products where trace levels of aromatic solvents are undesirable from the standpoint of health and safety and thus levels of those types of contaminating solvents in personal care consumer products are regulated.

All United States patents referenced herein are specifically herewith and hereby incorporated by reference.

EXPERIMENTAL

EXAMPLE 1

A 60 weight percent toluene solution of an MQ resin, having an M/Q molar ratio of about 0.65, a number average molecular weight of about 3,000 grams per mole and a silanol content of about 2.0 weight percent was vapor precipitated with water vapor at atmospheric pressure into a bag filter separator to capture the finely divided solids so produced. The vapor phase was condensed in a shell and tube type condenser. The solids as recovered contained 14 weight percent moisture, as water. The particle size distribution ranged from 0.40 microns to about 100 microns with a mean particle size of 14 microns. The solid particulate resin recovered from the bag filters was dried to remove the residual moisture content. Using a 20 centipoise polydimethylsiloxane fluid, it was possible to disperse the particulate resin so prepared, producing an optically transparent mixture using only mixing by hand. This indicates that the particulate silicone produced by the technique of the present invention is readily dispersible in low molecular weight silicone fluids.

A 3.518 g sample of the wet particulate silicone recovered from the bag filter was heated to 150° C. in a sealed septum vial and a 3 mL gas sample from the head space over the silicone was injected using a model 19395A Hewlett-Packard head space analyzer onto a 105 meter RTX-1 capillary gas chromatographic column. By comparison against a reference mixture containing 0.0009 g toluene per 20 mL head space, no toluene was detected in the sample. The limit of detection was 7 ppm by weight. Therefore, the process of the instant invention produces silicone samples with less than 7 ppm aromatic solvent in the product. Clearly, the process may be operated under more stringent conditions to achieve even higher levels of contaminating solvent removal. Thus it is preferable to remove the contaminating solvent to levels below 3 ppm by weight, more preferably below 1 ppm by weight, and most preferably below 0.5 ppm by weight.

EXAMPLE 2

For purposes of comparison, the same MQ resin toluene solution as in Example 1 was spray dried using a Niro portable HT spray dryer equipped with a two fluid nozzle. Spray drying was achieved at inlet/outlet temperatures of 200°/110° C. respectively employing nitrogen gas as a drying agent at a rate of 85 kg/hr. The weight ratio of nitrogen drying gas to MQ resin (as a 60 weight percent solution in toluene) was 0.72. The resulting MQ resin powder had an average particle size of 68 microns and contained 1.5 weight percent residual toluene solvent.

This example demonstrates by comparison that the use of an azeotrope forming co-solvent in spray drying a solution of a silicone results in a significant reduction in the contamination of the resulting powder by the contaminating solvent

DEFINITIONS

The endstopping groups M can be alternatively defined as:

$$M = R_3Si, \qquad \qquad a)$$

in contrast to the usual definition where:

$$M = R_3SiO_{1/2}. \qquad \qquad b)$$

Both of these definitions may sometimes create formal structural problems related to the presence or absence of a divalent oxygen linking species, if they are used interchangeably without regard to the formalities of the stoichiometric conventions being employed. When definition a) is used an additional oxygen atom must be inserted in the left side of structural formulas such as MDM, i.e. MODM, assuming D has been defined as:

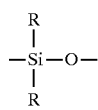

When definition b) is used the structural formula MDM in order to be precisely correct must be written MD(SiR$_2$)M in order to avoid an extra oxygen atom in the formula. The generally accepted trivial (or idiomatic) notations in silicone chemistry assume the practitioner having ordinary skill in the art (which for chemistry, according to the American Chemical Society, is possession of a Master of Science degree) recognizes the need for adding or deleting a divalent oxygen atom as necessary when these structural abbreviations are used, particularly if they are used interchangeably without regard to stoichiometric subtleties, depending on which definitions are used since the typical abbreviation is MDM and not MODM or MD(SiR$_2$)M even though contextually the latter two are correct depending on the definition of M while the former can be idiomatically or trivially correct or incorrect depending on whether definitions are mixed.

When fractional subscripts are used, conceptually the atom so designated is shared equally between two centers. As generally used in silicone chemistry this is for an oxygen atom shared equally between two silicon atoms. Thus a subscript of ½ refers to one catenating oxygen in a catenated structure of alternating silicon and oxygen atoms, 2/2 refers to two catenating oxygens, 3/2 refers to three catenating oxygens, and 4/2 refers to four catenating oxygens.

Likewise, a superscript H on one of the structural component abbreviations of M, D, or T, e.g. $M^H$ or $D^H$, indicates the substitution of a hydrogen atom for one of the R substituents indicating a conversion of the species to a so-called hydride or hydrogen siloxane. Further a superscript vi refers specifically to a vinyl substituent and generally to an alkenyl substituent; usually, alkenyl substituents are selected from the group of two to forty carbon atom alkenyl groups.

As used herein, Applicants define a contaminating solvent to be any unwanted solvent present in the product.

Having described the invention that which is claimed is:

1. A process for removing a contaminating solvent having a boiling temperature from a solution containing a solute comprising:
   (a) contacting said solution with a co-solvent having a boiling temperature wherein said co-solvent is immiscible with said solute and wherein said co-solvent boils at a temperature different from the boiling temperature of said contaminating solvent and wherein said co-solvent forms an azeotrope with said contaminating solvent; and
   (b) spray drying said solution contaminated with said solvent in the presence of said co-solvent wherein said solvent and said co-solvent distill azeotropically,
   whereby said contaminating solvent is removed from said solute.

2. The process of claim 1 wherein said spray drying is conducted at a pressure no greater than atmospheric pressure.

3. The process of claim 1 where the solvent is selected from the group of benzene, toluene, xylene, paraffinic solvents having from 1 to 20 carbon atoms, alcoholic solvents having from 1 to 10 carbon atoms and mixtures thereof.

4. The process of claim 3 where the solvent is selected from the group consisting of benzene, toluene and xylene.

5. The process of claim 4 where the co-solvent is selected from the group consisting of water, ethylene glycol, propylene glycol, butyl alcohol, isobutyl alcohol, allyl alcohol, acetic acid, 2-chloro-ethanol, ethylene diamine, nitroethane, pyruvic acid, 1-chloro-2-propanone, epichlorohydrin, propionic acid, and 1,2-propanone diol.

6. The process of claim 5 here the co-solvent is water.

7. The process of claim 2 where the solvent is selected from the group of benzene, toluene, xylene, paraffinic solvents having from 1 to 20 carbon atoms, alcoholic solvents having from 1 to 10 carbon atoms and mixtures thereof.

8. The process of claim 7 where the solvent is selected from the group consisting of benzene, toluene and xylene.

9. The process of claim 8 where the co-solvent is selected from the group consisting of water, ethylene glycol, propylene glycol, butyl alcohol, isobutyl alcohol, allyl alcohol, acetic acid, 2-chloro-ethanol, ethylene diamine, nitroethane, pyruvic acid, 1chloro-2-propanone, epichlorohydrin, propionic acid, and 1,2-propanone diol.

10. The process of claim 9 where the co-solvent is water.

* * * * *